(12) United States Patent
Barisic

(10) Patent No.: US 10,194,024 B2
(45) Date of Patent: Jan. 29, 2019

(54) NUMBER PORTABILITY DETERMINATION IN VARIABLE NUMBERING PLAN

(71) Applicant: Telefonaktiebolaget LM Ericsson (publ), Stockholm (SE)

(72) Inventor: Miroslav Barisic, Zagreb (HR)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 52 days.

(21) Appl. No.: 15/526,426

(22) PCT Filed: Nov. 28, 2014

(86) PCT No.: PCT/EP2014/076010
§ 371 (c)(1),
(2) Date: May 12, 2017

(87) PCT Pub. No.: WO2016/082898
PCT Pub. Date: Jun. 2, 2016

(65) Prior Publication Data
US 2018/0295233 A1    Oct. 11, 2018

(51) Int. Cl.
*H04M 3/42* (2006.01)
*H04Q 3/76* (2006.01)
*H04W 8/28* (2009.01)

(52) U.S. Cl.
CPC .......... *H04M 3/42297* (2013.01); *H04Q 3/76* (2013.01); *H04M 2203/15* (2013.01); *H04M 2203/558* (2013.01); *H04W 8/28* (2013.01)

(58) Field of Classification Search
CPC ....... H04M 3/42297; H04M 2203/558; H04M 2203/15; H04W 8/28; H04Q 3/76; H04Q 3/005
(Continued)

(56) References Cited

U.S. PATENT DOCUMENTS

| | | | | |
|---|---|---|---|---|
| 6,865,266 | B1 * | 3/2005 | Pershan | H04M 3/42297 |
| | | | | 379/201.01 |
| 7,995,738 | B1 * | 8/2011 | Ward | H04Q 3/005 |
| | | | | 370/217 |
| 2005/0086225 | A1 | 4/2005 | Cheng et al. | |

FOREIGN PATENT DOCUMENTS

EP     1460862 A1     9/2004

* cited by examiner

*Primary Examiner* — Thjuan K Addy
(74) *Attorney, Agent, or Firm* — Murphy, Bilak & Homiller, PLLC

(57) ABSTRACT

A system or method for determining if a telephony network number is ported for use with variable numbering plan comprising, a first network node for receiving a number message comprising at least a first part of a dialled number identifying a called party, and a number portability database, containing routing numbers associated with entries in the database. The first network node is configured to compare the number message with entries in the number portability database. The first network node is configured such that if the number message or a first part of the number message uniquely matches with the whole of an entry in the database and does not match with part of another entry in the database, the first network node determines that a best match has been found. In this case, the first network node routes a call to a second network node identified by the routing number associated with the entry. The first network node is configured such that if the number message matches with at least part of at least one entry in the database, the first network node determines that at least one partial match has been found. The first network node then retrieves a further part of the dialled number. The first network node repeats the comparison based on a new number message comprising said first part of the dialled number and said further part of the dialled number. The first network node is configured
(Continued)

such that if at least a first part of the number message cannot be matched to the whole of any entry in the database, the first network node determines that no match has been found. In this case, the first network node routes a call to a second network node identified by the dialled number.

14 Claims, 7 Drawing Sheets

(58) Field of Classification Search
USPC .................. 379/221.13, 221.14, 219, 221.09
See application file for complete search history.

| ENTRY | ROUTING NUMBER |
|---|---|
| 1234567 | 11 |
| 1235 | 1133 |
| 12789 | 1155 |
| 156789 | 2277 |
| 12359 | 2233 |

Figure 3

NUMBER PORTABILITY DETERMINATION IN VARIABLE NUMBERING PLAN

TECHNICAL FIELD

This invention relates to the provision of a number portability algorithm for number portability for use with a variable numbering plan.

BACKGROUND

Number portability is the ability of a customer owning a particular fixed or mobile telephone number to reassign the telephone number to another carrier ("Service Provider Portability"), move it to another location ("Geographic Portability"), or change the type of service ("Service Portability"). The customer is therefore able to change these attributes of their service without having to change the telephone number which they are using.

A variable numbering plan is a type of numbering scheme used in telecommunications to assign telephone numbers to subscribers, where the length of each telephone number is not fixed.

Alternatively, closed numbering plans impose a specific number of digits for each telephone number. Different numbering plans are operated in different countries and territories.

In both variable and closed numbering plans, overlap dialling can be implemented. Overlap dialling is when a telephone number can be specified partially to complete the first stage of a particular routing path. In other words, the number may be formed of a plurality of separate messages, e.g. an Initial Address Message (IAM) and one or more Subsequent Address Messages (SAMs) or e.g. multiple Session Initiation Protocol (SIP) INVITEs.

For a variable numbering plan, overlap dialling is an important feature as the length of the complete telephone number is unknown. The end of the dialling can be signalled by an inter-digit timer, or some other method, for example if it is known that a particular series has a particular length. In overlap dialling, a first part of the telephone number is received from the calling party with only a small delay between the reception of the digits and a second part may be received in overlap mode where an inter-digit timer watches a maximum time between the digits until the complete number has been received.

However, if the use of an inter-digit timer for signalling the end of dialling by a time out, in order to perform number porting is not accepted, it is necessary to determine an alternative way to identify whether or not a number is ported, as it is not clear when the end of a dialled number occurs. In particular when the length of the number to be ported is not known, waiting for a presumed last digit before the number porting is performed is regarded a problem.

SUMMARY

According to the present invention there is provided a system for determining if a telephony network number is ported which may comprise, a first network node for receiving a number message comprising at least a first part of a dialled number identifying a called party, and a number portability database, containing routing numbers associated with entries in the database. The first network node may be configured to compare the number message with entries in the number portability database.

The first network node may be configured such that if the number message or a first part of the number message uniquely matches with the whole of an entry in the database and does not match with part of another entry in the database, the first network node determines that a best match has been found. In this case, the first network node may route a call to a second network node identified by the routing number associated with the entry.

The first network node may also be configured such that if the number message matches with at least part of at least one entry in the database, the first network node determines that at least one partial match has been found. The first network node may then retrieve a further part of the dialled number.

The first network node may also repeat the comparison based on a new number message comprising said first part of the dialled number and said further part of the dialled number.

The first network node may also be configured such that if at least a first part of the number message cannot be matched to the whole of any entry in the database, the first network node determines that no match has been found. In this case, the first network node may route a call to a second network node identified by the dialled number.

According to a further aspect of the present invention there is provided a method of determining if a telephony network number is ported, which may comprise the steps of receiving in a first network node a number message comprising at least a first part of a dialled number identifying a called party, comparing the number message with entries in a number portability database, the database containing routing numbers associated with the entries.

The method may further comprise if the number message or a first part of the number message uniquely matches with the whole of an entry in the database and does not match with part of another entry in the database: determining that a best match has been found. In this case the method may further comprise routing a call to a second network node identified by the routing number associated with said entry.

In some embodiments the method further comprises if the number message matches with at least part of at least one entry in the database: determining that at least one partial match has been found. In this case the method may further comprise retrieving a further part of the dialled number; and repeating said comparing based on a new number message comprising said first part of the dialled number and said further part of the dialled number.

In some embodiments the method further comprises if at least a first part of the number message cannot be matched to the whole of any entry in the database: determining that no match has been found. In this case the method may further comprise routing a call to a second network node identified by the dialled number.

In some embodiments the method further comprises, if the number message matches with at least part of at least one entry and at least a first part of the number message matches with the whole of an entry: determining that at least one partial match and a match has been found, and retrieving a further part of the dialled number (606).

According to a further aspect of the invention there is provided a method for use in a network node of determining if a telephony network number is ported which may comprise the steps of, receiving a number message comprising at least a first part of a dialled number identifying a called party and comparing the number message with entries in a number portability database, the database containing routing numbers associated with the entries.

The method may further comprise if the number message or a first part of the number message uniquely matches with the whole of an entry in the database and does not match with part of another entry in the database: determining that a best match has been found. In this case the method may further comprise routing a call based on the routing number associated with the entry.

in some embodiments the method may further comprise if the number message matches with at least part of at least one entry in the database: determining that at least one partial match has been found. In this case the method may further comprise retrieving a further part of the dialled number; and repeating said comparing based on a new number message comprising said first part of the dialled number and said further part of the dialled number.

In some embodiments the method may further comprise if at least a first part of the number message cannot be matched to the whole of any entry in the database: determining that no match has been found. In this case the method may further comprise routing a call based on the dialled number.

In some embodiments the method further comprising, if the number message matches with at least part of at least one entry in the database and at least a first part of the number message matches with the whole of an entry in the database, determining that at least one partial match and a match have been found. In this case the method may further comprise retrieving a further part of the dialled number.

In some embodiments the first part of the number message has a pre-configurable number of digits and/or is dependent on the number of first received number message.

In some embodiments if a best match is found, the method comprises routing the call to a network which is identified by the routing number.

In some embodiments if a best match is found, the method comprises routing the call to a node in said network, wherein the node is identified by the routing number.

In some embodiments the method further comprises determining if any further digits of the dialled number need to be retrieved and, if so, routing the call based on the received number message and the further digits.

In some embodiments if no match is found, the method comprises routing the call to a network which is identified by the dialled number.

The method may further comprise determining if any further digits of the dialled number need to be retrieved and, in some embodiments, routing the call based on the received number message and the further digits.

According to a further aspect of the present invention there is provided a network node for determining if a telephony network number is ported comprising a communication module for receiving a number message comprising at least a first part of a dialled number identifying a called party, and a processor for comparing the number message with entries in a number portability database, the database containing routing numbers associated with the entries.

The processor may be configured to if the number message or a first part of the number message uniquely matches with the whole of an entry in the database and does not match with part of another entry in the database: determine that a best match has been found. In the case the processor may route a call based on the routing number associated with said entry.

The processor may be configured to if the number message matches with at least part of at least one entry in the database: determine that at least one partial match has been found; retrieve a further part of the dialled number (606); and repeat said comparing based on a new number message comprising said first part of the dialled number and said further part of the dialled number.

The processor may be configured to if at least a first part of the number message cannot be matched to the whole of any entry in the database: determine that no match has been found. In this case the processor may route a call based on the dialled number.

The processor may be further configured to if the number message matches with at least part of at least one entry and at least a first part of the number message matches with the whole of an entry: determine that at least one partial match and a match has been found, and retrieve a further part of the dialled number.

According to a further aspect of the present invention there is provided a computer program product containing computer readable medium for causing a network node to perform the steps of: receiving a number message comprising at least a first part of a dialled number identifying a called party, and comparing the number message with entries in a number portability database, the database containing routing numbers associated with the entries.

In some embodiments if the number message or a first part of the number message uniquely matches with the whole of an entry in the database and does not match with part of another entry in the database: determining that a best match has been found, and routing a call based on the routing number associated with said entry.

In some embodiments if the number message matches with at least part of at least one entry in the database: determining that at least one partial match has been found; and retrieving a further part of the dialled number; and repeating said comparing based on a new number message comprising said first part of the dialled number and said further part of the dialled number.

In some embodiments if at least a first part of the number message cannot be matched to the whole of any entry in the database: determining that no match has been found, and routing a call based on the dialled number.

According to a further aspect of the present invention there is provided a network node for determining if a telephony network number is ported comprising a communication module for receiving a number message comprising at least a first part of a dialled number identifying a called party and a comparison module for comparing the number message with entries in a number portability database, the database containing routing numbers associated with the entries.

The portability determination module may be configured to if the number message or a first part of the number message uniquely matches with the whole of an entry in the database and does not match with part of another entry in the database: determine that a best match has been found.

The portability module may be further configured to if the number message matches with at least part of at least one entry in the database: determine that at least one partial match has been found; and retrieve a further part of the dialled number; and repeat said comparing based on a new number message comprising said first part of the dialled number and said further part of the dialled number.

The portability module may be further configured to if at least a first part of the number message cannot be matched to the whole of any entry in the database: determine that no match has been found.

The network node may further comprises a routing module for; if a it is determined that a best match is found, routing a call based on the routing number associated with said entry and if it is determined that no match is found, routing a call based on the dialled number.

In some embodiments the portability determination module is further configured to; if the number message matches with at least part of at least one entry and at least a first part of the number message matches with the whole of an entry: determine that at least one partial match and a match has been found, and retrieve a further part of the dialled number.

Thus, the algorithm can determine whether a number has been ported, and can route a call according to the determination.

This has the advantage that the method can be implemented in any convenient network node, without requiring the use of a solution using Intelligent Networks operation. This can mean that the system is easy to integrate with other network nodes.

The number portability database is preferably able to contain a single entry that represents multiple dialled numbers. In some embodiments, the number portability database is able to contain a single entry, in the form of a partial number, that represents multiple possible dialled numbers beginning with that partial number. In some embodiments, the number portability database is able to contain a single entry, in the form of a partial number, that represents all possible dialled numbers beginning with that partial number, except for any possible dialled numbers that are represented by another database entry. This has the advantage that the number of entries in the number portability database can be lower than would otherwise be the case.

BRIEF DESCRIPTION OF THE DRAWINGS

For a better understanding of the present invention, and to show how it may be put into effect, reference will now be made, by way of example to the accompanying drawings, in which:

FIG. 3 is a diagram illustrating an example of entries in a database;

DETAILED DESCRIPTION

As mentioned previously, number portability is the ability of a customer owning a particular fixed or mobile telephone number to reassign the telephone number to another carrier ("Service Provider Portability"), move it to another location ("Geographic Portability"), or change the type of service ("Service Portability"). The customer is therefore able to change these attributes of their service without having to change the telephone number which they are using. If the number has not been ported, then calls to that number need to be routed to a network (and possibly a specific switch within that network) that is identified by the number itself. However, if the number has been ported, then the number no longer necessarily identifies the network to which such calls must be routed. One type of number portability could apply to service numbers where the prefix of the dialed number indicates the service provider and all service numbers having that prefix are ported to the service provider's network/network node.

Embodiments of the present invention implement a matching mechanism within a switch or server in order to determine whether or not numbers dialled within a network are ported or not ported.

The matching mechanism is an algorithm which is able to check the number portability and route the call to the correct recipient network, whilst maintaining an acceptable number of entries in a Number Portability Data Base (NPDB). The particular steps carried out by the algorithm are described in relation to FIGS. 3 and 4.

It would seem that a form of Intelligent Network (IN) would be needed in order to provide a mechanism for collecting the overlap digits, in order to determine whether a particular number is ported. For example if the Initial Address Message (IAM) of a dialled number is a partial match for a number in the NPDB, further Subsequent Address Messages (SAMs) will need to be received to better identify the intended recipient and determine if the number is indeed ported. However, embodiments of the present invention instead implement the matching mechanism from within a switch or server, without the need to provide any further IN nodes to instruct the switch/exchange or server to collect additional digits.

Figure 1:
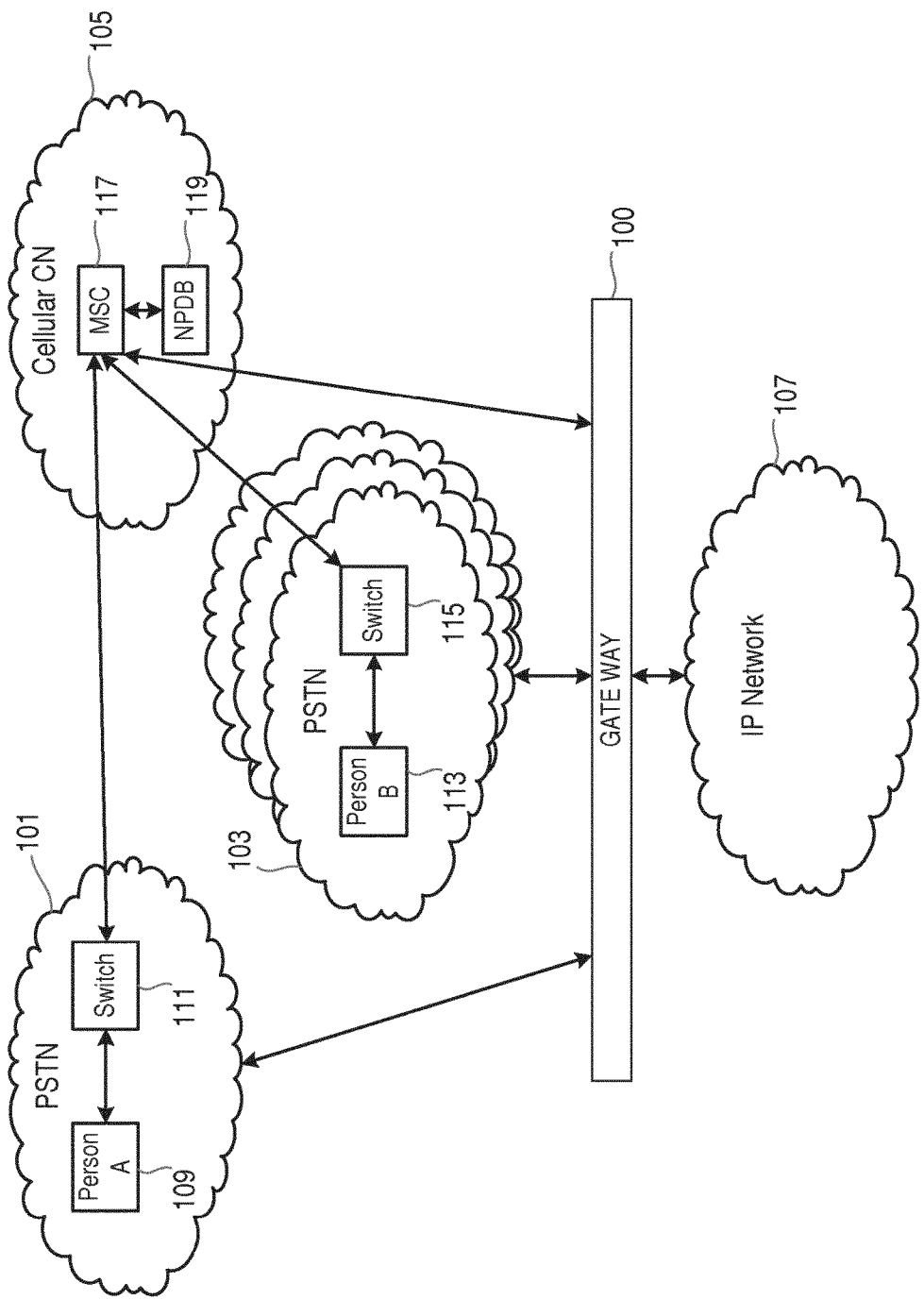
FIG. 1 is a block diagram illustrating an embodiment of a network.

FIG. 1 illustrates a network according to an embodiment of the invention. There are four different networks illustrated, a first Public Switched Telephone Network (PSTN) fixed network 101, a second PSTN network 103, a cellular Core Network (CN) 105, and a Internet Protocol (IP) network 107. A first user, identified here as Person A, 109 is within the first PSTN network 101 connected to a fixed switch 111. It will be appreciated that any number of switches could be present in the first PSTN fixed network 101, and that the network will typically include multiple users.

The second PSTN network comprises a second user, identified here as Person B, 113 connected to a fixed switch 115. Similarly, it will be appreciated that any number of switches could be present in the second PSTN fixed network 103, and that the network will typically include multiple users.

The cellular CN 105 includes nodes suitable for handling calls according to any suitable cellular communications standard. For the purposes of describing the present invention, it is sufficient to note that the cellular CN 105 comprises a Mobile Switching Centre (MSC) 117, which in this case is connected to a Number Portability Data Base (NPDB) 119. It will be appreciated that the cellular CN 105 may exist alongside other cellular networks.

The cellular CN 105, the first PSTN 101 and the second PSTN 103 are connected via a gateway 121 to the IP Network 107.

Both the switches 111 and 115, in the PSTN networks 101 and 103 respectively, are connected to the MSC 117 in the cellular core network 105.

In some embodiments of the present invention, the MSC of the cellular Core Network is used to determine the number portability of B-numbers being dialled within the fixed network. It will however be appreciated that any switch server or network node in any network could be used to provide this function. For example, the switch might be located in one of the PSTNs 101, 103, or a separate switch performing the relevant function might be provided in each of the PSTNs 101, 103. Similarly, although the number portability database 119 is shown in FIG. 1 as being located within the cellular core network 105, it could in practice be in any convenient location with a connection to the MSC 117. It will be appreciated that any number of different types of fixed, cellular and IP networks may be used, and that a switch, server or network node in any one of these types of network could carry out the function of the MSC 117 as described here.

In one example of the operation of the system, the person A 109 attempts to connect a voice call to person B 113 whose telephone number, that is, the B-number for this specific voice call, has been ported into the PSTN network 103. Although telephone numbers can be used to represent a series of physical switches to which the actual phone represented by the B-number is connected, in this case the porting of the number means that the B-number of the person B no longer actually represents the series of switches to which his phone is actually attached.

A Routing Number (RN) therefore needs to be determined to indentify the network, or even the node within the network, to which the B-number has been ported.

As the number of the person B has been ported, it may be stored as an entry in the NPDB 119, associated with the Routing Number (RN) identifying at least the network to which the B-number has been ported. In this example, therefore, the relevant entry in the database associates the number of the person B with a RN that represents the PSTN network 103.

In some embodiments, the RN will represent a specific node within the network to which the B-number has been ported. In this case, the RN would, in the example described above, represent the switch 115.

It will be appreciated that the person A could be located within a cellular network such as the cellular network 105, or within the IP network 107. If the person A is located within a cellular network, the method described herein is useful if the dialled number is sent using overlap dialling. Similarly, the person B could be located within a cellular network such as the cellular network 105, or within the IP network 107. If the person B is located within a cellular network, the method described herein is particularly useful if the cellular network uses a variable numbering plan. This invention can therefore be equivalently applied to either fixed or mobile number portability in appropriate circumstances.

Figure 2:
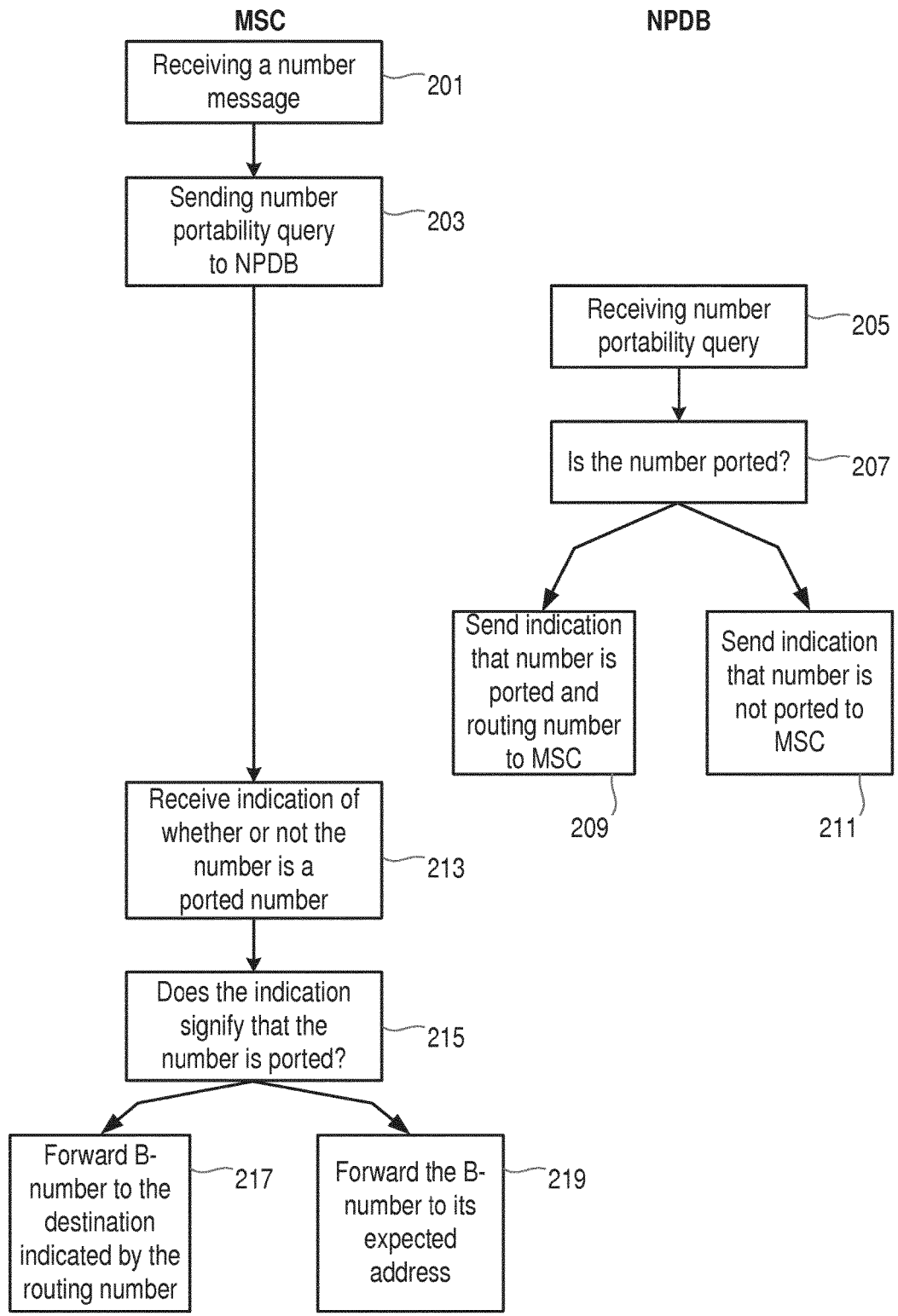
FIG. 2 is a flow chart illustrating embodiments of method steps.

FIG. 2 is a flow chart illustrating in general terms the operations carried out in both the MSC 117 and the NPDB 119.

When person A dials the B-number (which actually represents the previous endpoint which person B occupied, as it has been ported), a number message is sent, via the switch 111, to the MSC of the cellular CN.

In step 201 the MSC receives a Number message from a switch in the PSTN fixed network 101. In step 203 the MSC sends a number portability query to the NPDB.

The number portability query is received by the NPDB in step 205. In step 207 the NPDB determines if the number is ported or not. As described in more detail below, this may be an iterative process, in that the initial number portability query sent by the MSC to the NPDB may not be sufficient to produce an unambiguous answer, and further information may need to be sent from the MSC to the NPDB.

Eventually, the NPDB is able to make a final determination that the number is ported, in which case the process moves to step 209, in which the NPDB sends an indication to the MSC that the number is ported, and also sends the Routing Number associated with that ported number to the MSC.

If the MSC determines that the number is not ported, the process moves to step 211, in which the NPDB sends an indication to the MSC that the number is not ported.

In step 213, the MSC receives the indication of whether or not the number is ported from the NPDB. In step 215 the MSC determines if the indication signifies that the number is ported, or not ported.

The number may be ported in various different ways. For example, the physical location of the network point where the telephone is attached may have changed, but the user may wish to keep the same number, so the number will be ported to the new location, i.e. Geographic Portability. Alternatively, the service provider may have changed, i.e. Service Provider Portability and the call may be diverted to another service provider's network or network node.

If the number is ported, the process passes to step 217, and the MSC forwards the number message to the destination indentified by the routing number. In some embodiments the routing number itself is also sent to the identified destination.

If the number is not ported, the process passes to step 219, and the MSC forwards the number message to the destination which is implied by the number itself, namely the expected address indicated by a fixed number.

Again, it should be appreciated that the steps carried out by the MSC may alternatively be carried out in a switch, server or network node within any other network, including the PSTN network.

In order to determine that the number is ported, the Number Portability Data Base, NPDB must contain an entry which is a Best Match for the number message that has been received. As mentioned above, the process of querying the NPDB may be iterative, and hence the number message that is under consideration at any given time may comprise the first part of the dialled number, or may comprise all of the dialled number.

In order to illustrate what is meant by a Best Match, an example of possible entries in the NPDB has been given in FIG. 3.

FIG. 3 illustrates an example of entries in a Number Portability Database according to an embodiment of the invention The NPDB may contain entries which may relate to individual numbers in the network. For example, in FIG. 3 the entry "1234567" may be the fixed number of person whose number has been ported to a network which may be identified by the routing number "11".

Similarly, the entries "12789" and "156789" may be the fixed numbers of subscribers whose numbers have been ported. In these cases, however, the NPDB entry indicates not only the network to which the numbers have been ported, but specific switches within those networks. Thus, the number "12789" has been ported to a network identified by "11", and specifically to a node "55" within that network. Thus, the NPDB entry for the ported number "12789" contains the routing number "1155". Similarly, the number "156789" has been ported to a network identified by "22", and specifically to a node "77" within that network. Thus, the NPDB entry for the ported number "156789" contains the routing number "2277".

It will be noted that, in this example, a variable numbering plan is in use, and hence the subscriber numbers "1234567", "12789" and "156789" are different lengths.

The NPDB may also contain entries which refer to, for example, a Private (Automatic) Branch Exchange (PBX, PABX). An example of an entry relating to a PBX is the entry "1235" which relates to a PBX whose whole system has been ported to a node in the network "11" which can be identified by the routing number "1133". Thus, the routing number "1133" first identifies the network "11", and then the node "33" within the network "11".

However, in this example, the NPDB also contains a separate entry referring to a subscriber associated with the Private Branch Exchange having the number "1235", whose number has been ported to a different network from the remainder of the PBX. Thus, there is an entry for the specific subscriber number "12359", which has been ported to a node "33" in the network "22" which can therefore be identified by the routing number "2233".

Thus, the number portability database entry "12359" relates to one specific subscriber associated with the PBX, while the number portability database entry "1235" relates to all of the other subscribers, having numbers of the form "1235X", for all values of X that are not equal to 9.

The number portability database entry "1235" may also relate to longer numbers, and may for example relate to all subscribers, having numbers of the form "1235X . . . ", where there can be any number of digits "X . . . ".

Similarly, the number portability database entry "12359" may relate to a group of subscribers, having numbers of the form "12359X . . . ", where there can be any number of digits "X . . . ".

A Best Match occurs when the numbers contained in the NPDB, match at least the first part of the numbers received in the number message, and there are no other entries in the database which could potentially provide a match.

For example, considering the illustrative NPDB entries shown in FIG. 3, if the number message "123" has been received by the MSC, it is not possible to find a Best Match as there are three entries in the NPDB which could potentially match, namely "1235", "1234567" or "12359". These are described as "Partial Matches".

If a further digit is received, so that the number message "1235" has been received, then a "Match" is made for the entry "1235". However, this does not equate to a Best Match as the entry "12359" also exists.

However, if the digits "1235" are followed by another digit, X, which is not 9, (or no further digits are received) then a Best Match can be made for "1235". This is because the numbers "1235X" represent a specific node in the network attached to the PBX which has been ported to the network node "1133".

By using the entry "1235" in the NPDB to represent all numbers "1235XX . . . " which may contain a number of digits beyond the digits "1235", the size of the database is greatly reduced.

However, if the numbers "12359" are received, a Best Match is made for the "12359" entry which has been individually specified as having the routing number "2233". This number of the PBX system is therefore individually ported separately from the rest of the system.

Figure 4A:
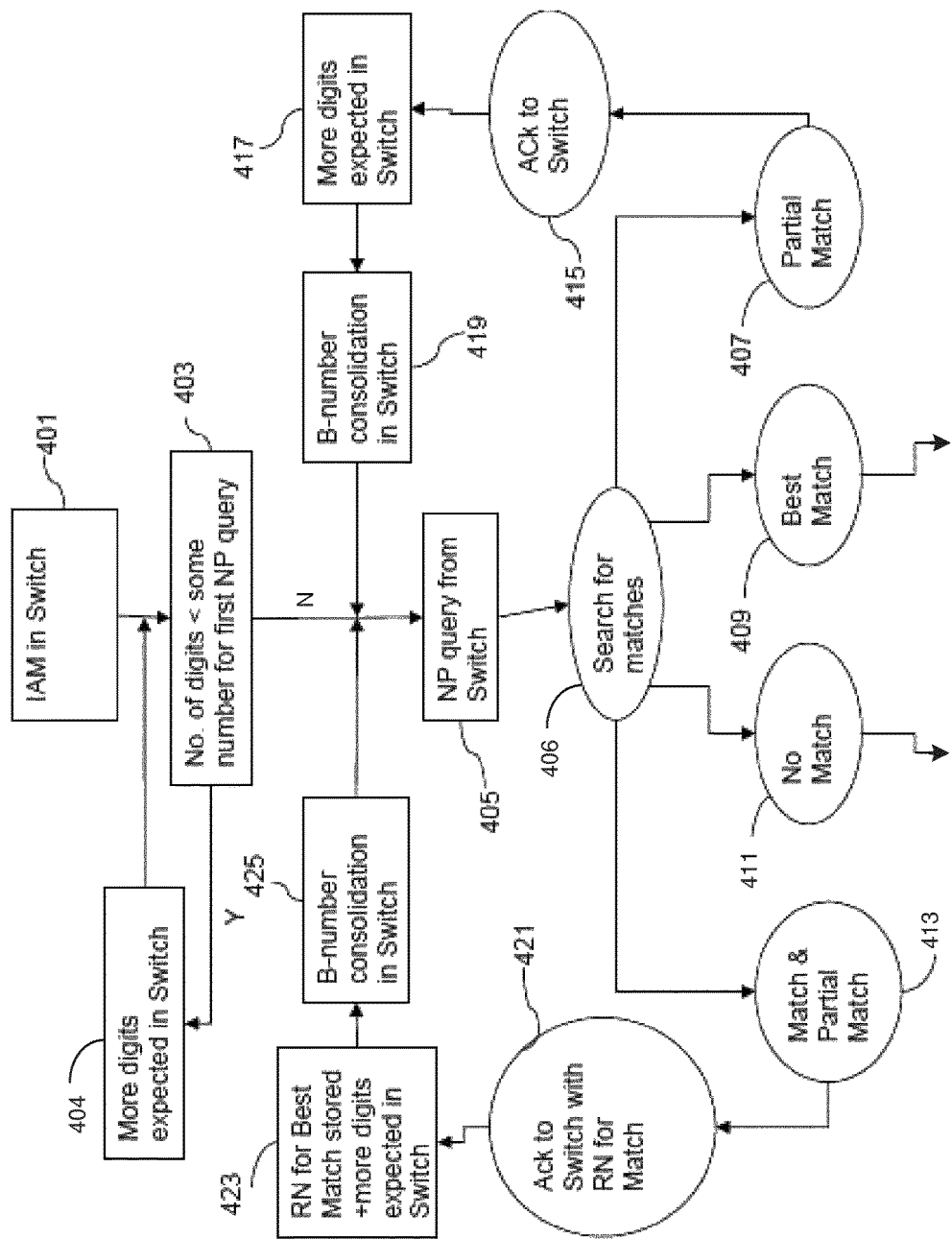
FIG. 4 is a flowchart illustrating embodiments of method steps.
Figure 4B:
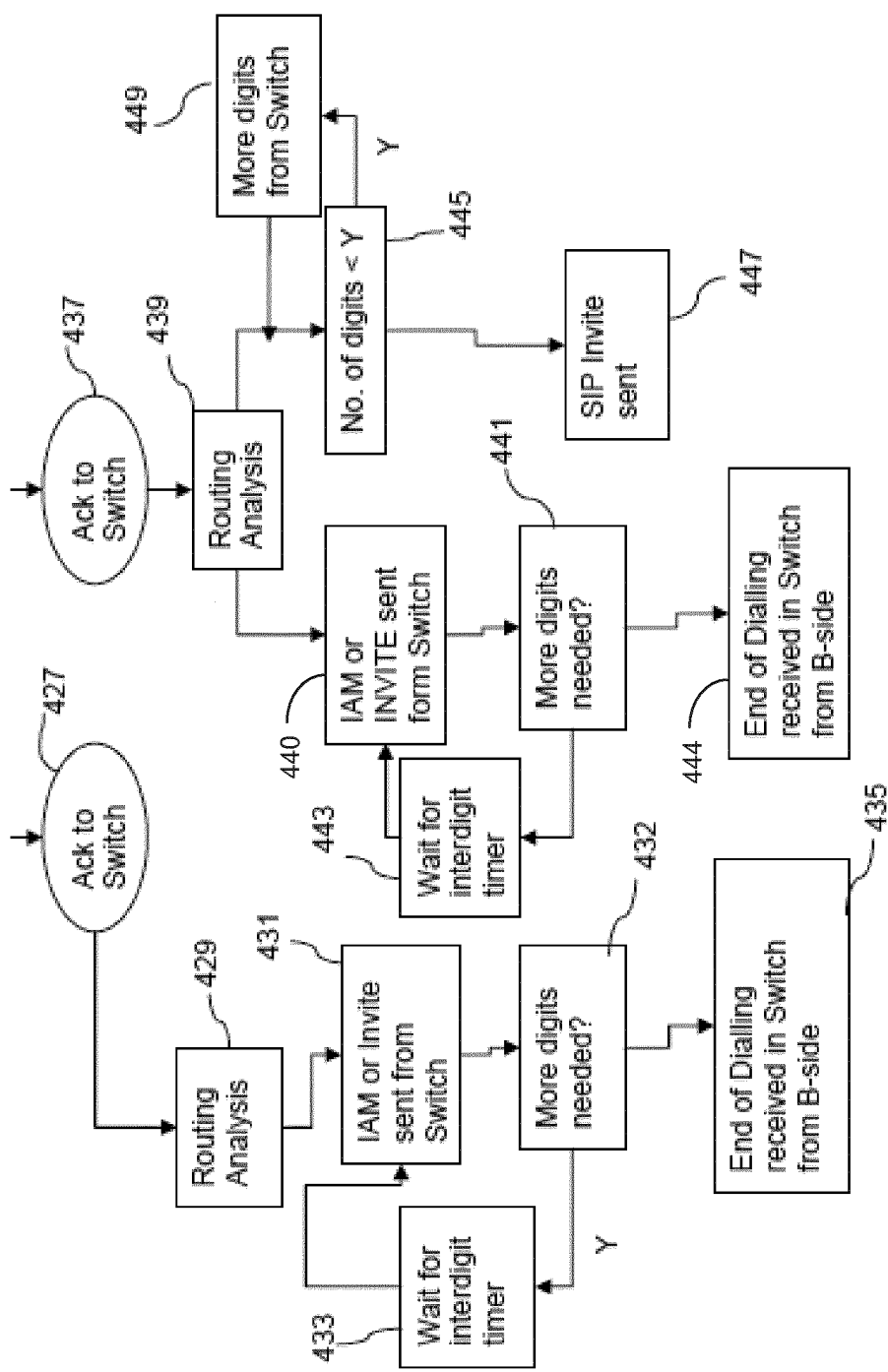

A more detailed description of a possible method for how to implement the determination is given with respect to FIG. 4, which describes the Best Match algorithm.

FIG. 4 is a flowchart illustrating a Best Match algorithm according to embodiments of the invention. This figure illustrates a more detailed example of the steps carried out in FIG. 2. In this embodiment, the algorithm used is the Best Match algorithm.

The method is described here in the context of a system that uses ISDN (Integrated Services Digital Network) User Part, or ISUP, to set up telephone calls in the public switched telephone network (PSTN). In the ISUP call set-up procedure, the digits dialed by a calling subscriber are used to create an Initial Answer Message (IAM) containing at least the first part of the dialed number, and may also be used to create one or more Subsequent Address Messages (SAMs) containing further digits of the dialed number.

In step 401 an IAM is received in a switch, server or network node, such as the MSC 117 shown in FIG. 2. It is then determined, in step 403, if the number of digits in the IAM is greater than a predetermined number for starting number portability queries. For example, in one embodiment this number is 4. If the number of digits is less than the predetermined number, the process proceeds to step 404, until one or more additional digits has been received. If the number of digits is greater than or equal to the predetermined number, the process proceeds to step 405 in which a number portability query is sent from the switch to the NPDB 119.

The NPDB then searches in step 406 for Best and Partial matches in the database. This involves comparing the number received in the number message, which contains at least a first part of the dialled number, with the entries in the NPDB, starting from the left-most digits of those entries. In this illustrated embodiment, there are four possible outcomes from the search for Best and Partial matches. The result of the query may be a Partial Match, as shown at 407, a Best Match as shown at 409, No Match, as shown at 411 or both a Match and a Partial Match, as shown at 413.

At 407, only a Partial Match has been found. This would occur, for example, when, referring to FIG. 3, the numbers "156" have been received, giving a Partial Match for the entry "156789".

At 413 both a Match and a Partial Match have been found. This would occur, for example, when, referring to FIG. 3, the numbers "1235" are received, giving a Match for the entry "1235" and a Partial Match for the entry "12359".

At 409, a Best Match has been found. This would occur, for example, when, referring to FIG. 3, the numbers "1234567" are received, giving a Best Match for the entry "1234567".

Finally, at 411, a No Match result has been found. This would occur, for example, when, referring to FIG. 3, the numbers "1875" are received which cannot be matched to any of the entries in the database.

All of the above comparisons take place by comparing the left most digit of the number message with the left most digit of the entry in the database and proceeding to compare each following digit of the number message with the next digit of the entry in the NPDB.

If there is only a Partial Match, as at 407, the method proceeds to step 415, where an acknowledgment is sent back from the NPDB to the switch, indicating that a partial match has been found but that more digits are needed to determine if it is a Best Match for the dialled B-number.

The switch 117 receives this acknowledgement in step 417 and waits to receive one or more Subsequent Address Messages (SAMs) from the switch 111 that originated the call. It then consolidates any received SAM with the IAM and any previously received SAM, in step 419. The step 405 is then repeated and a further number portability query is sent to the NPDB. If an interdigit timer expires, and there is no response from the B-number based on the digits received, a busy tone is sent to the calling party If there is both a Match and a Partial Match as at 413, the method proceeds to step 421 and an acknowledgment is sent back to the switch 117, indicating that both a Partial Match and a Match have been found, and again indicating that more digits are required to determine if any of the Partial Matches and/or Matches are a Best Match for the number being dialled.

If Match and a Partial Match is the outcome, the NPDB may also send the routing number for the current Match with this acknowledgment to the switch 117. It is useful for the switch 117 to store the current Best Match since it could be the Best Match at the end (i.e. if no "better" Best Match is found).

The switch 117 receives this acknowledgement in step 423 and waits to receive SAMs from the switch. It then consolidates any received SAM with the IAM and any previously received SAM in step 425. The step 405 is then repeated and a further number portability query is sent to the NPDB. If an interdigit timer expires, and there is no response from the B-number based on the digits received, a busy tone is sent to the calling party.

This, if the initial result of the search is that a Match and one or more Partial Match is found, the eventual result when more digits have been received will be a Best Match. However, if the initial result of the search is that one or more Partial Match is found, without also finding a Match, the eventual result when more digits have been received may be a Best Match or may be No Match.

If the result of the search is found at 411 to be No Match, then the method proceeds to step 427 and the NPDB sends an acknowledgment to the switch 117, reporting that no matches or partial matches have been found.

Routing analysis is then carried out by the switch 117 in step 429 to determine the destination network that the call needs to be routed to. This can be determined from the original B-number.

An IAM or SIP INVITE message is then sent in step 431 from the switch 117 to the recipient network determined in step 429.

If it has been determined by the NPDB that the received digits cannot match any entry in the database, that is that a No Match result has been found, but the numbers received do not yet specify a complete B-number, it will be determined at step 432 that further SAM(s) are required. An interdigit timer may then be set in step 433 to wait for further SAM(s) to be received. If an interdigit timer expires, and there is no response from the B-number based on the digits received, a busy tone is sent to the calling party.

Once the full B-number has been received, the IAM and any subsequent SAMs which have been received are sent from the switch 117 to the recipient network identified in step 429. A call can then be set up in accordance with the conventional procedure.

A response may be received at the switch 117 from the B-side network in step 435. This response may comprise an Address complete message (ACM), an Answer message (ANM) or a Release message (REL).

If there is a found at 409 that there is a Best Match, as described above, the method proceeds to step 437 and an acknowledgement is sent to the switch 117 indicating that a Best Match has been found. The Routing Number which is associated with the identified Best Match is also sent to the switch 117.

Routing Analysis is then carried out in step 439 to determine the destination network that the call needs to be routed to. This can be determined from the routing number received from the NPDB which is associated with the Best Match. In some cases the routing number will also specify a particular switch within the specified network.

If it is determined in step 439 that the destination network indicated by the routing number is a Fixed network, then the process passes to step 440, and an IAM is sent from the switch 117 to the identified fixed network, preferably including the RN that was found. It is then determined in step 441 if any further SAM(s) are needed.

Once the full B-number has been received the IAM and any subsequent SAMs which have been received are sent from the Switch 117 to the recipient network identified in step 439.

If it is determined in step 441 that further SAM(s) are needed, for example if the Best Match was associated with a PBX and further numbers are required to indicate the particular recipient within the PBX, the process passes to step 443 where an interdigit timer period is used to wait to receive any further SAM(s). If the interdigit timer expires, and there is no response from the B-number based on the digits received, a busy tone is sent to the calling party.

If no further SAM(s) are required, the IAM and any previously received SAM(s) are sent to the recipient network identified in step 439. Alternatively, if further SAM(s) are required, once the full B-number has been received the IAM and any subsequent SAMs which have been received are sent from switch 117 to the recipient network identified in step 439. A call can then be set up in accordance with the conventional procedure.

A response may be received at the switch 117 from the B-side network in step 444. This response may comprise an Address complete message (ACM), an Answer message (ANM) or a Release message (REL).

Similarly, if it is determined in step 439 that the destination network indicated by the routing number is a VoIP network that supports overlap dialling, then the process again passes to step 440, and a SIP Invite is sent from the switch 117 to the identified VoIP network. It is then determined in step 441 if any further digits are needed.

If it is determined in step 441 that further digits are needed, for example if the Best Match was associated with a PBX and further digits are required to indicate the particular recipient within the PBX, the process passes to step 443 where an interdigit timer period is used to wait to receive any further digits. If the interdigit timer expires, and there is no response from the B-number based on the digits received, a busy tone is sent to the calling party.

If no further digits are required, the SIP Invite is sent to the recipient network identified in step 439. Alternatively, if further digits are required, once the full B-number has been received the Invite is sent from switch 117 to the recipient network identified in step 439. A call can then be set up in accordance with the conventional procedure.

However, if it is determined in step 439 that the destination network indicated by the routing number is a VoIP network that does not support overlap dialling, the process passes to step 445. In this case, it is necessary that the entire B-number is received by the switch and sent in one INVITE to the recipient network.

Therefore, In step 445 it is determined whether or not the number of digits that has been received is less than Y, where Y is the number of digits in a VoIP B-number. If not, i.e. if Y digits have been received, the process passes to step 447 where an SIP INVITE is sent with all the digits received from the switch 111.

If the number of digits is less than Y, the process passes to step 449 and an inter-digit timer is used to receive further SAM(s).

Once the number of digits received reaches Y, the process passes to step 447 and the SIP INVITE is sent. The VoIP call can then be set up in accordance with the conventional procedure.

There is thus described a procedure that allows the switch 117 to determine from received digits whether the dialled number has been ported, and to route a call based on that dialled number, whether or not the number has been ported. This is described here with reference to a situation in which a call is received from a fixed or VoIP phone, and is directed to a fixed or VoIP number, which may have been ported. However, it will be appreciated that a very similar method might be used in other circumstances, and is for example advantageous in cases in which the calling party is a mobile number using overlap dialling, and/or where the called party is a mobile number in a network that uses a variable numbering plan.

Figure 5A:
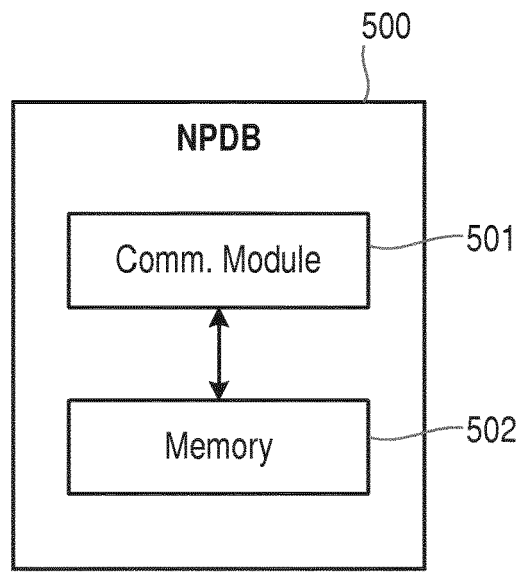
FIG. 5a is a block diagram illustrating an embodiment of a Number Portability DataBase.

FIG. 5a is a block diagram illustrating a NPDB generally indicated 500 according to an embodiment of the invention. In this embodiment the NPDB comprises a communications module 501 and a memory block 502. Thus, the communications module 501 is able to communicate with other network elements, in particular the MSC, which may comprise the NPDB. The NPDB 500 is therefore able to receive queries from the MSC, and return responses to the MSC. The memory block 502 contains the number portability entries, for example in the form illustrated in FIG. 3.

Figure 5B:
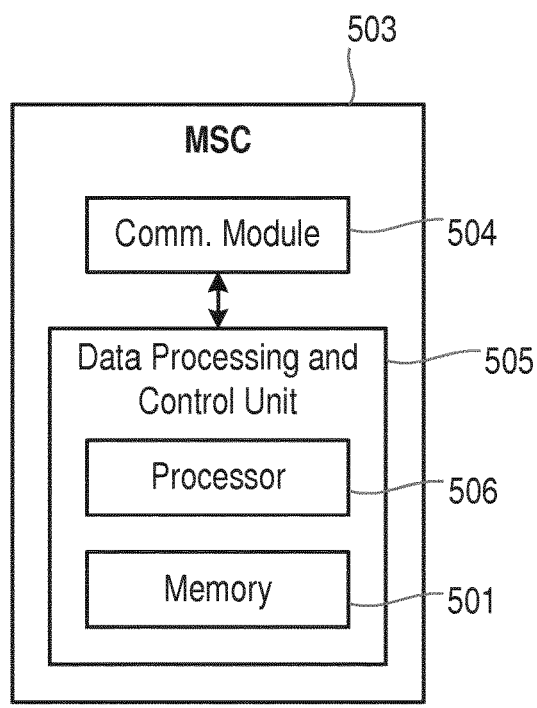
FIG. 5b is a block diagram illustrating an embodiment of a Mobile Switching Centre.

FIG. 5b is a block diagram illustrating an MSC such as switch 117, generally indicated 503 according to an embodiment of the invention. In this embodiment, the MSC comprises a communications module 504 and a data processing and control unit 505. In particular, the data processing and control unit 505 comprises a processor 506 and a memory block 507.

Thus, the communications module 504 allows the MSC to receive messages from PSTN switches such as the switch 111 shown in FIG. 1, and to send messages to PSTN switches such as the switch 115 shown in FIG. 1. The communications module 504 also allows the MSC to address queries to the number portability database regarding dialled numbers, and to receive replies from the number portability database indicating whether such numbers have been ported.

The memory block 507 can for example store program instructions, for causing the processor 506 to perform the method described herein.

Figure 6:
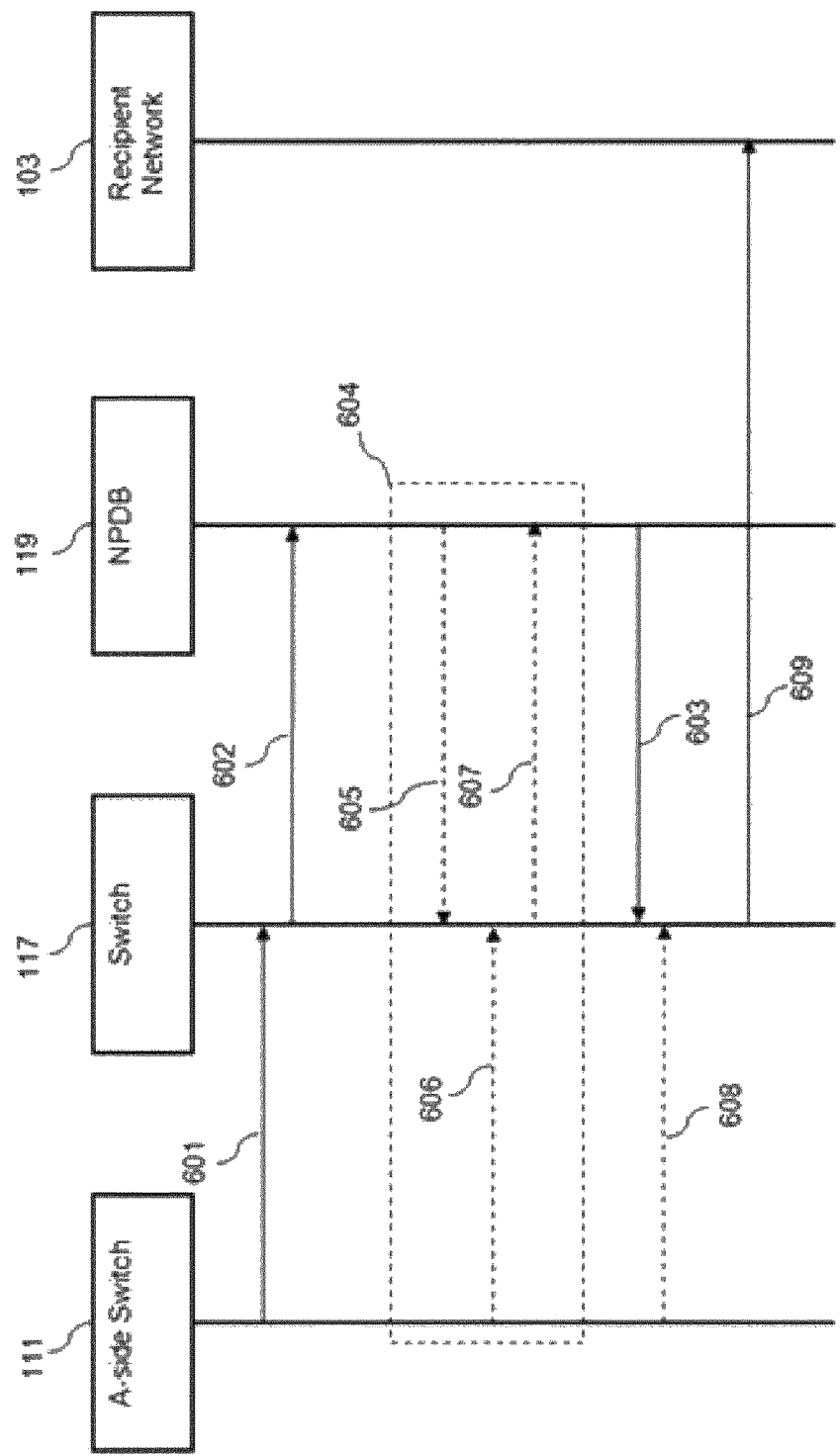
FIG. 6 is a signalling diagram, showing messages sent in a method as described herein.

FIG. 6 is a signalling diagram illustrating the signalling between an A-side switch 111, a switch 117, a number portability database (NPDB) 119 and a recipient network 103.

In step 601 the A-side switch 111 signals to the switch 117 that is has received from a user at least the first part of a dialled number identifying a called party, and it sends to the switch 117 an IAM comprising the received digits.

In some embodiments the IAM will only be sent when a certain number of digits, for example four, have been received by the switch 111.

The switch 117 then sends a number portability query, step 602, to a NPDB 119. This instructs the NPDB to compare the digits of the IAM to the entries in the database. The NPDB then makes a comparison of the number message with entries in the NPDB, the database containing routing numbers associated with the entries.

If the number message or a first part of the number message uniquely matches with the whole of an entry in the database and does not match with part of another entry in the database, the switch 117 determines that a Best Match has been found.

If at least a first part of the number message cannot be matched to the whole of any entry in the database, the switch 117 determines that No Match has been found.

If there is a Best Match or No Match as described above, an indication 603 is sent from the NPDB back to the switch 111 that either a Best Match or No Match has been found.

If the indication is that a Best Match has been found, the indication 603 also comprises a routing number from the database associated with the Best Match.

If the number message matches with at least part of at least one entry in the database: the switch 117 determines that at least one Partial Match has been found. In this case, the messages shown within the box 604 are sent.

Firstly, the NPDB 119 will send a message 605 to the switch indicating that either a Partial Match has been found or a Match and a Partial Match have been found.

If a Match has been found alongside a Partial Match, even if this is not a Best Match, in some embodiments the indication 605 may also include the routing number from the database associated with the Match.

The switch 117 will then retrieve a further part of the dialled number. For example, by waiting to receive an SAM 606 from the A-side switch 111. The switch 117 then repeats the comparison with entries in the NPDB based on a new number message comprising said first part of the dialled number and said further part of the dialled number.

For example, the switch 117 may consolidate the received IAM and SAM and resend the portability query 607 to the NPDB 119, this time instructing to the NPDB to compare the digits of the IAM combined with the SAM to the entries in the database.

If at this stage a Best Match or No Match is found, the indication 603 is sent from the NPDB back to the switch 111 that either a Best Match or No Match has been found. However, it will be appreciated that there may still only be a Partial Match, or a Match and a Partial Match in the NPDB and hence in this circumstance the steps in box 604 are repeated until a Best Match or No Match is found.

In some circumstances the switch 117 may have to wait to receive one or more further SAM(s) 608 from the switch 111 before sending the connection request 609 to the recipient network.

The recipient network will vary depending on the results of the Best Match algorithm. If the number is ported, i.e. a Best Match has been found, the recipient network will be the network identified by the routing number associated with the Best Match. However, if No Match is found, the recipient network will be the network identified by the dialled number, i.e. the combination of the IAM and any further SAM(s) received by the switch 117.

Thus, the algorithm can determine whether a number has been ported, and can route a call according to the determination.

This has the advantage that the method can be implemented in any convenient network node, without requiring the use of a solution using Intelligent Networks operation. This can mean that the system is easy to integrate with other network nodes. Also, the method allows the use of a number portability database that is preferably able to contain a single entry that represents multiple dialled numbers. This has the advantage that the number of entries in the number portability database can be lower than would otherwise be the case.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single feature or other unit may fulfil the functions of several units recited in the claims. Any reference signs in the claims shall not be construed so as to limit their scope.

The invention claimed is:

1. A system configured for determining if a telephony network number is ported, comprising:
    a first network node configured to receive a number message comprising at least a first part of a dialed number identifying a called party; and
    a number portability database, containing routing numbers associated with entries in the database;
    the first network node being configured to compare the number message with entries in the database, and the first network node being configured such that:
        if the number message or a first part of the number message uniquely matches with the whole of an entry in the database and does not match with part of another entry in the database, the first network node determines that a best match has been found and routes a call to a second network node identified by the routing number associated with said entry,
        if the number message matches with at least part of at least one entry in the database, the first network node determines that at least one partial match has been found, retrieves a further part of the dialed number and repeats said comparison based on a new number message comprising said first part of the dialed number and said further part of the dialed number, and
        if at least a first part of the number message cannot be matched to the whole of any entry in the database, the first network node determines that no match has been found and routes a call to a second network node identified by the dialed number.

2. A method of determining if a telephony network number is ported, comprising:
    receiving, in a first network node, a number message comprising at least a first part of a dialed number identifying a called party;
    comparing the number message with entries in a number portability database, the database containing routing numbers associated with the entries;
    if the number message or a first part of the number message uniquely matches with the whole of an entry in the database and does not match with part of another entry in the database, determining that a best match has been found and routing a call to a second network node identified by the routing number associated with said entry;
    if the number message matches with at least part of at least one entry in the database, determining that at least one partial match has been found, retrieving a further part of the dialed number and repeating said comparing based on a new number message comprising said first part of the dialed number and said further part of the dialed number; and
    if at least a first part of the number message cannot be matched to the whole of any entry in the database, determining that no match has been found and routing a call to a second network node identified by the dialed number.

3. The method as claimed in claim 2, further comprising, if the number message matches with at least part of at least one entry and at least a first part of the number message matches with the whole of an entry, determining that at least one partial match and a match has been found and retrieving a further part of the dialed number.

4. A method for use in a network node of determining if a telephony network number is ported, comprising:
    receiving a number message comprising at least a first part of a dialed number identifying a called party;
    comparing the number message with entries in a number portability database, the database containing routing numbers associated with the entries;
    if the number message or a first part of the number message uniquely matches with the whole of an entry in the database and does not match with part of another entry in the database, determining that a best match has been found and routing a call based on the routing number associated with said entry;
    if the number message matches with at least part of at least one entry in the database, determining that at least one partial match has been found, retrieving a further part of the dialed number and repeating said comparing based on a new number message comprising said first part of the dialed number and said further part of the dialed number; and
    if at least a first part of the number message cannot be matched to the whole of any entry in the database, determining that no match has been found and routing a call based on the dialed number.

5. The method as claimed in claim 4, further comprising, if the number message matches with at least part of at least one entry in the database and at least a first part of the number message matches with the whole of an entry in the database, determining that at least one partial match and a match have been found, and retrieving a further part of the dialed number.

6. The method as claimed in claim 4, wherein the first part of the number message has a pre-configurable number of digits.

7. The method as claimed in claim 4, further comprising:
    if a best match is found, routing the call to a network that is identified by the routing number.

8. The method as claimed in claim 7, further comprising:
    if a best match is found, routing the call to a node in said network, wherein the node is identified by the routing number.

9. The method as claimed in claim 8, further comprising determining if any further digits of the dialed number need to be retrieved and, if so, routing the call based on the number message and the further digits.

10. The method as claimed in claim 4, further comprising:
    if no match is found, routing the call to a network which is identified by the dialed number.

11. The method as claimed in claim 10, further comprising determining if any further digits of the dialed number need to be retrieved and, if so, routing the call based on the number message and the further digits.

12. A network node configured for determining if a telephony network number is ported, comprising:
    communication circuitry configured for receiving a number message comprising at least a first part of a dialed number identifying a called party; and processing circuitry operatively associated with the communication circuitry and configured to:
- compare the number message with entries in a number portability database, the database containing routing numbers associated with the entries;
- if the number message or a first part of the number message uniquely matches with the whole of an entry in the database and does not match with part of another entry in the database, determine that a best match has been found and route a call based on the routing number associated with said entry;
- if the number message matches with at least part of at least one entry in the database, determine that at least one partial match has been found, retrieve a further part of the dialed number and repeat said comparing based on a new number message comprising said first part of the dialed number and said further part of the dialed number; and
- if at least a first part of the number message cannot be matched to the whole of any entry in the database, determine that no match has been found and route a call based on the dialed number.

13. The network node as claimed in claim 12, wherein the processing circuitry is configured to:
- if the number message matches with at least part of at least one entry and at least a first part of the number message matches with the whole of an entry, determine that at least one partial match and a match has been found and retrieve a further part of the dialed number.

14. A non-transitory computer readable medium storing a computer program containing computer instructions that, when executed on processing circuitry of a network node, cause the network node to:
- receive a number message comprising at least a first part of a dialed number identifying a called party;
- compare the number message with entries in a number portability database, the database containing routing numbers associated with the entries;
- if the number message or a first part of the number message uniquely matches with the whole of an entry in the database and does not match with part of another entry in the database, determine that a best match has been found and route a call based on the routing number associated with said entry;
- if the number message matches with at least part of at least one entry in the database, determine that at least one partial match has been found retrieve a further part of the dialed number; and repeat said comparison based on a new number message comprising said first part of the dialed number and said further part of the dialed number; and
- if at least a first part of the number message cannot be matched to the whole of any entry in the database, determine that no match has been found and route a call based on the dialed number.

* * * * *